Patented Apr. 14, 1953

2,635,099

UNITED STATES PATENT OFFICE 2,635,099

PROCESS FOR PRODUCING ORGANIC SOLVENT SOLUBLE ALLYL STARCH

Eugene A. Talley and Elias Yanovsky, Philadelphia, Pa., assignors to the United States of America as represented by the Secretary of Agriculture No Drawing. Application July 11, 1947, Serial No. 760,487

12 Claims. (Cl. 260—233.3)

(Granted under Title 35, U. S. Code (1952), sec. 266)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a process for preparing allyl ethers of starch. Among its objects is an improved method for producing organic solvent soluble allyl starch.

In Nichols et al. patent, U. S. Patent No. 2,413,463, dated December 31, 1946, there is described a method of producing allyl starch soluble in organic solvents, by allylating starch in the presence of concentrated aqueous alkali and an organic solvent for allyl starch. Although the allyl starch thus produced is soluble in practically all organic solvents, with the exception of aliphatic hydrocarbons, not all these solvents are equally well adapted for use in the process of the aforementioned patent application.

For example, if the reaction is conducted in the presence of an alcohol, the allylating agent reacts with the alcohol, as well as with the starch. The use of water immiscible solvents, such as benzene, toluene, or chlorobenzene, necessitates vigorous and efficient agitation of the reaction mixture in order to effect thorough intermixture of the components. Since the most readily available allylating agent, allyl chloride, boils at the relatively low temperature of about 45° C., the prior process is usually conducted in an autoclave or similar vapor-tight vessel which is not readily fitted with effective stirring devices. Lower ketones, such as acetone or methyl ethyl ketone, are solvents eminently well adapted for use in the process, but these compounds form condensation products by interaction with the alkali, and although this secondary reaction has no detrimental effect on the prior process, it results in loss of the solvent. These difficulties are avoided by our new process.

We have found that allyl starch soluble in organic solvents can be produced by reacting starch with an allylating agent in the absence of an organic solvent.

In accordance with the method of our invention, starch is reacted with an allylating agent, such as allyl bromide or allyl chloride, in the presence of concentrated aqueous akali under conditions essentially analogous to those utilized in the process described in U. S. Patent No. 2,413,463, but in the absence of organic solvent. Upon completion of the allylation, the resulting product is solubilized by contacting it with an organic solvent capable of dissolving allyl starch. The solubilization of the allyl starch can be effected either by heating the reaction product with the solvent or, preferably, by contacting it with an organic solvent in an acid medium in accordance with the method disclosed by Robert M. Hamilton and Elias Yanovsky in their application for patent, Serial No. 760,486, filed July 11, 1947, now Patent No. 2,524,792.

The process of our invention is applicable to the allylation of any native starch, such as corn starch, potato starch, and wheat starch, and modified starches, such as thin boiling starches, dextrins, and oxidized starches.

Solubilization of the allylated starch in an organic solvent is effected subsequent to the allylation reaction, substantially in the absence of any allylating agent, and can also be conducted in an acid medium. Consequently, the solubilization step can be conducted without the use of special equipment, and any organic solvent for allyl starch can be utilized without causing undesirable secondary reactions.

Suitable solvents include, for example, methyl, ethyl, propyl, or butyl alcohol; acetone, methyl ethyl ketone; benzene, toluene, xylene, and other aromatic hydrocarbons; chlorobenzene and other halogenated aromatic hydrocarbons; ethyl acetate, butyl acetate, and similar esters; dioxane and other organic solvents for allyl starch.

The following examples illustrate the invention:

Example 1

A mixture consisting of 800 grams of potato starch, 980 grams of 50% aqueous solution of sodium hydroxide, and 985 grams of allyl chloride was heated at 90° C. in an autoclave for about 4 hours at which time the allylation reaction was substantially completed. Four liters of acetone were then added and heating at 90° C. continued for about 30 hours. The resulting solution was steam distilled to remove the solvent, and the gummy distillation residue was washed with water. The allyl starch thus obtained contained 1.6 allyl groups per glucose unit.

A similar product was obtained by an analogous procedure using an equivalent amount of allyl bromide as the allylating agent and conducting the reaction under reflux.

Solubilization of the allylated starch can also be effected by the method described by Robert M. Hamilton and Elias Yanovsky in their application, Serial No. 760,486, filed July 11, 1947. In accordance with that method, the product obtained upon completion of the above-described allylation reaction was treated with 4 liters of acetone and 55 cc. of concentrated hydrochloric acid. On heating the resulting mixture (having a pH of about 2 to 3) at 90° C., solubilization of the allyl starch occurred within 45 minutes.

*Example 2*

A mixture consisting of 980 grams of 50% aqueous solution of sodium hydroxide, 800 grams of corn starch, 8 grams of sodium iodide, and 985 grams of allyl chloride was heated at 90° C. for 4 hours. Then 4 liters of acetone and 70 cc. of concentrated hydrochloric acid were added and heating continued at 90° C. for another hour. The allyl starch so produced contained 1.65 allyl groups per glucose unit.

*Example 3*

A mixture consisting of 245 grams of water, 490 grams of sodium hydroxide, 800 grams of corn starch, 8 grams of sodium iodide, and 985 grams of allyl chloride was heated at 90° C. for 4½ hours. Then 3500 cc. of toluene and 80 cc. of concentrated hydrochloric acid were added and the heating continued for another hour and a half at 90° C. The allyl starch so produced contained 1.7 allyl groups per glucose unit.

*Example 4*

A mixture consisting of 1080 grams of 50% aqueous solution of sodium hydroxide, 800 grams of potato starch, 8 grams of sodium iodide, and 985 grams of allyl chloride was heated at 90° C. for 3½ hours and then for 30 minutes with 4 liters of acetone and 120 cc. of concentrated hydrochloric acid at 90° C. The allyl starch so produced contained 1.6 allyl groups per glucose unit.

The yields of solvent soluble allyl starch obtained by procedures described in the foregoing examples were from 80 to 90 per cent of the theoretical yield.

Similar results were also obtained by the same or analogous procedures using equivalent amounts of potassium hydroxide and potassium iodide instead of the sodium compounds.

Other acids, such as sulfuric or phosphoric, may be substituted for the hydrochloric acid. The rate of solubilization increases with the temperature. The pH of the mixture in the solubilization step is maintained below 7, preferably, and, to best advantage, at about 2 or 3.

While the preferred temperature range in the allylation step and in the treatment with organic solvent is 70 to 100° C., operation outside of this range is within the broad purview of our teaching, in the light of which skilled operators may readily adjust the temperature and the duration of treatment to obtain best results.

Having thus described our invention, we claim:

1. A process of preparing organic solvent soluble allyl starch comprising allylating starch by heating it with allyl chloride in the presence of concentrated aqueous alkali metal hydroxide solution and in the absence of an organic solvent thereby forming organic solvent insoluble allyl starch, and after substantial completion of the allylation adding acidified inert organic solvent to the resulting reaction mixture and continuing the heating in said solvent to render the allyl starch soluble therein, the solvent being taken from the group consisting of methyl, ethyl, and propyl alcohol, acetone, methyl ethyl ketone, benzene, toluene, xylene, chlorobenzene, ethyl acetate, butyl acetate, and dioxane.

2. The process in accordance with claim 1 wherein the solvent is acetone.

3. The process in accordance with claim 1 wherein the solvent is methyl ethyl ketone.

4. The process in accordance with claim 1 wherein the solvent is toluene.

5. The process in accordance with claim 1 wherein the solvent is benzene.

6. The process in accordance with claim 1 wherein the solvent is dioxane.

7. A process of preparing organic solvent soluble allyl starch comprising allylating starch by heating it with an allyl halide in the presence of concentrated aqueous alkali metal hydroxide solution and in the absence of an organic solvent thereby forming organic solvent insoluble allyl starch, and after substantial completion of the allylation adding an inert organic solvent to the resulting reaction mixture and continuing the heating in said solvent to render the allyl starch soluble therein, the solvent being taken from the group consisting of methyl, ethyl, and propyl alcohol, acetone, methyl ethyl ketone, benzene, toluene, xylene, chlorobenzene, ethyl acetate, butyl acetate, and dioxane.

8. The process in accordance with claim 7 wherein the solvent is acetone.

9. The process in accordance with claim 7 wherein the solvent is methyl ethyl ketone.

10. The process in accordance with claim 7 wherein the solvent is toluene.

11. The process in accordance with claim 7 wherein the solvent is benzene.

12. The process in accordance with claim 7 wherein the solvent is dioxane.

EUGENE A. TALLEY.
ELIAS YANOVSKY.

References Cited in the file of this patent

UNITED STATES PATENTS

| Number | Name | Date |
|---|---|---|
| 1,350,820 | Lilienfeld | Aug. 24, 1920 |
| 1,767,382 | Leuchs | June 24, 1930 |
| 2,398,767 | Burke | Apr. 23, 1946 |
| 2,405,973 | Nichols et al. | Aug. 20, 1946 |
| 2,413,463 | Nichols et al. | Dec. 31, 1946 |